US011016862B2

(12) United States Patent
Miller et al.

(10) Patent No.: US 11,016,862 B2
(45) Date of Patent: *May 25, 2021

(54) ERROR-INITIATED MIRROR REDRIVE TO COLLECT DIAGNOSTIC INFORMATION

(71) Applicant: International Business Machines Corporation, Armonk, NY (US)

(72) Inventors: Dash D. Miller, St. Louis Park, MN (US); Miguel A. Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,828

(22) Filed: May 23, 2017

(65) Prior Publication Data

US 2018/0341538 A1   Nov. 29, 2018

(51) Int. Cl.
*G06F 11/20* (2006.01)

(52) U.S. Cl.
CPC .................... *G06F 11/20* (2013.01)

(58) Field of Classification Search
CPC .................................................. G06F 11/0778
USPC ........................................................... 714/45
See application file for complete search history.

(56) References Cited

U.S. PATENT DOCUMENTS

| | | | | |
|---|---|---|---|---|
| 5,119,377 A | * | 6/1992 | Cobb | .................... G06F 11/366 714/38.11 |
| 6,636,908 B1 | * | 10/2003 | Winokur | ................ G06F 13/122 709/233 |
| 7,292,961 B2 | | 11/2007 | Dias et al. | |
| 8,024,299 B2 | | 9/2011 | Dias et al. | |
| 8,055,855 B2 | | 11/2011 | Sarkar et al. | |
| 8,271,955 B1 | * | 9/2012 | Lindahl | ............... G06F 11/3636 717/128 |
| 8,504,994 B2 | | 8/2013 | Golender et al. | |
| 9,087,092 B2 | | 7/2015 | Doster et al. | |
| 2005/0251794 A1 | | 11/2005 | Taylor et al. | |

(Continued)

FOREIGN PATENT DOCUMENTS

EP    2256636 A1    12/2010

OTHER PUBLICATIONS

"Met Manager User Manual," Author Unknown, User's Manual Version 1.5 to Support Met Manager Version 4.2x, Available at https://novalynx.com/manuals/110-ws-16smm-manual.pdf, Dec. 6, 2002.

*Primary Examiner* — Matthew M Kim
*Assistant Examiner* — Indranil Chowdhury
(74) *Attorney, Agent, or Firm* — Nelson and Nelson; Daniel P. Nelson

(57) ABSTRACT

A method for collecting diagnostic information associated with an error is disclosed. In one embodiment, such a method includes detecting an error condition associated with mirroring data from a primary volume to a secondary volume. In response to detecting the error condition, the method modifies various diagnostic parameters to improve collection of diagnostic information. The method then immediately re-drives the data from the primary volume to the secondary volume. This will ideally recreate the error. Upon recreating the error, the method captures diagnostic information associated with the error in accordance with the modified diagnostic parameters. A corresponding system and computer program product are also disclosed.

18 Claims, 6 Drawing Sheets

(56) References Cited

U.S. PATENT DOCUMENTS

| | | | |
|---|---|---|---|
| 2005/0278706 A1* | 12/2005 | Garza | G06F 11/3636 717/128 |
| 2009/0105982 A1* | 4/2009 | Sarig | G06F 11/0748 702/108 |
| 2009/0106596 A1* | 4/2009 | Fallen | G06F 11/0748 714/37 |
| 2012/0179936 A1* | 7/2012 | Masser | G06F 11/0727 714/38.11 |
| 2014/0075138 A1* | 3/2014 | Doster | G06F 11/3476 711/162 |
| 2014/0351655 A1* | 11/2014 | Malinowski | G06F 11/0727 714/45 |
| 2016/0012200 A1* | 1/2016 | Malinowski | G06F 11/0778 705/2 |
| 2017/0255535 A1* | 9/2017 | Freeman | G06F 11/0766 |
| 2018/0357115 A1* | 12/2018 | Miller | G06F 11/0745 |

* cited by examiner

ERROR-INITIATED MIRROR REDRIVE TO COLLECT DIAGNOSTIC INFORMATION

BACKGROUND

Field of the Invention

This invention relates to systems and methods for collecting diagnostic information associated with an error.

Background of the Invention

In z/OS Global Mirror, data is asynchronously mirrored from a primary storage system to a secondary storage system in order to maintain two consistent copies of data. The primary and secondary storage systems may be located at different sites, perhaps hundreds or thousands of miles away from one another. In the event the primary storage system fails, I/O may be redirected to the secondary storage system, thereby enabling continuous operations. When a write operation is issued to a primary volume, the changes are typically propagated to a secondary volume a few seconds after the data is written to the primary volume. However, additional changes may occur to the primary volume before the secondary volume has verified that it received the original changes associated with the write operation.

When z/OS Global Mirror or other asynchronous data mirroring functionality copies data from a primary volume to a secondary volume across long distances, a large number of error conditions may occur. Such error conditions may include, for example, an invalid track format error, a no record found condition, a storage shortage error, or the like. Each error condition may require a specific set of diagnostic information to determine the root cause of the error. In many cases, an administrator is unable to capture the desired set of diagnostic information because various diagnostic tools are not enabled at the time an error occurs. Such diagnostic tools often consume significant overhead if they are allowed to run continuously and thus are often disabled during normal operations.

In view of the foregoing, what are needed are systems and methods to more effectively collect diagnostic information associated with an error in an asynchronous data mirroring environment.

SUMMARY

The invention has been developed in response to the present state of the art and, in particular, in response to the problems and needs in the art that have not yet been fully solved by currently available systems and methods. Accordingly, the invention has been developed to provide systems and methods to collect diagnostic information associated with errors in asynchronous data mirroring environments. The features and advantages of the invention will become more fully apparent from the following description and appended claims, or may be learned by practice of the invention as set forth hereinafter.

Consistent with the foregoing, a method for collecting diagnostic information associated with an error is disclosed. In one embodiment, such a method includes detecting an error condition associated with mirroring data from a primary volume to a secondary volume. In response to detecting the error condition, the method modifies various diagnostic parameters to improve collection of diagnostic information. The method then immediately re-drives the data from the primary volume to the secondary volume. This will ideally recreate the error. Upon recreating the error, the method captures diagnostic information associated with the error in accordance with the modified diagnostic parameters.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
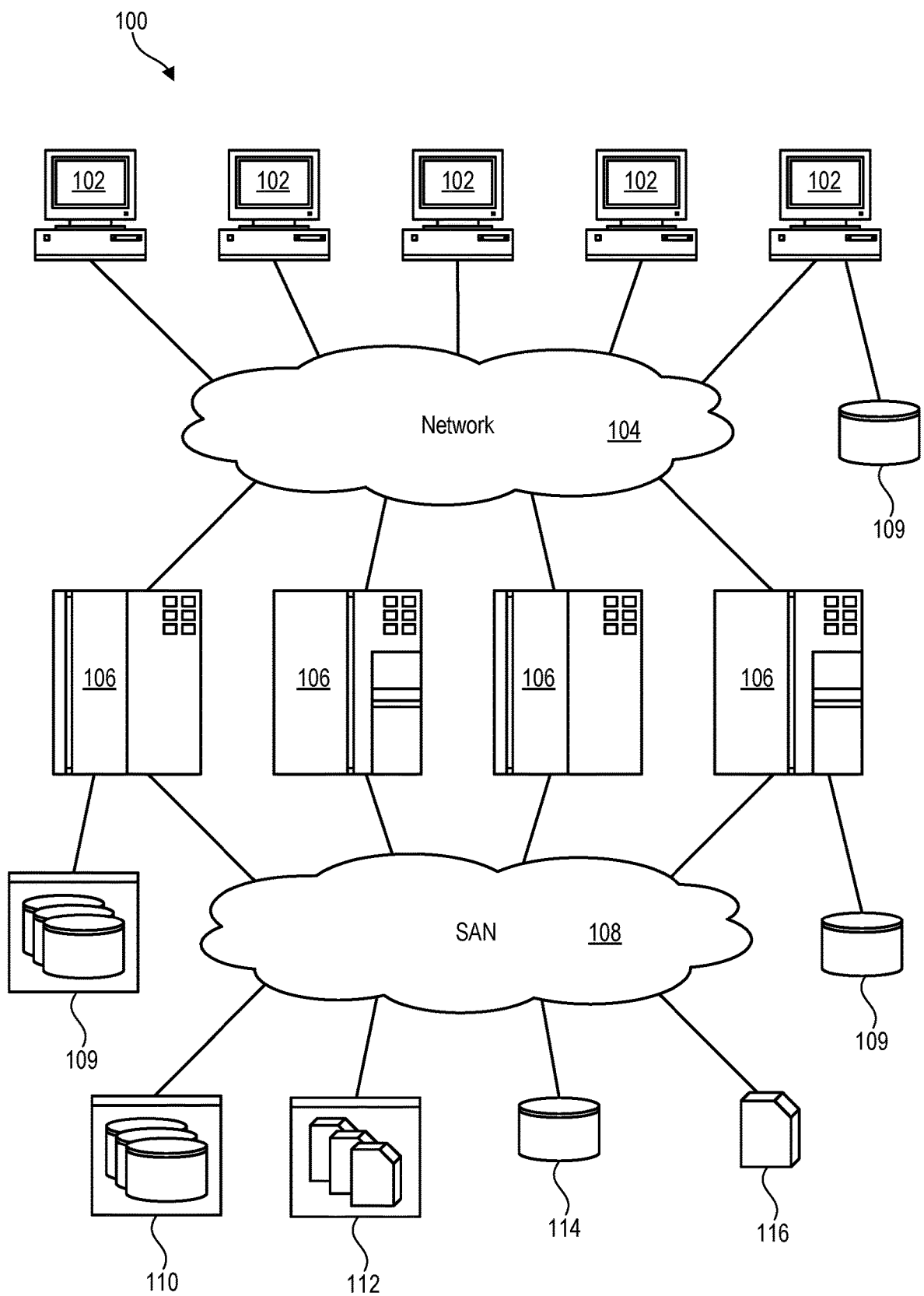
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
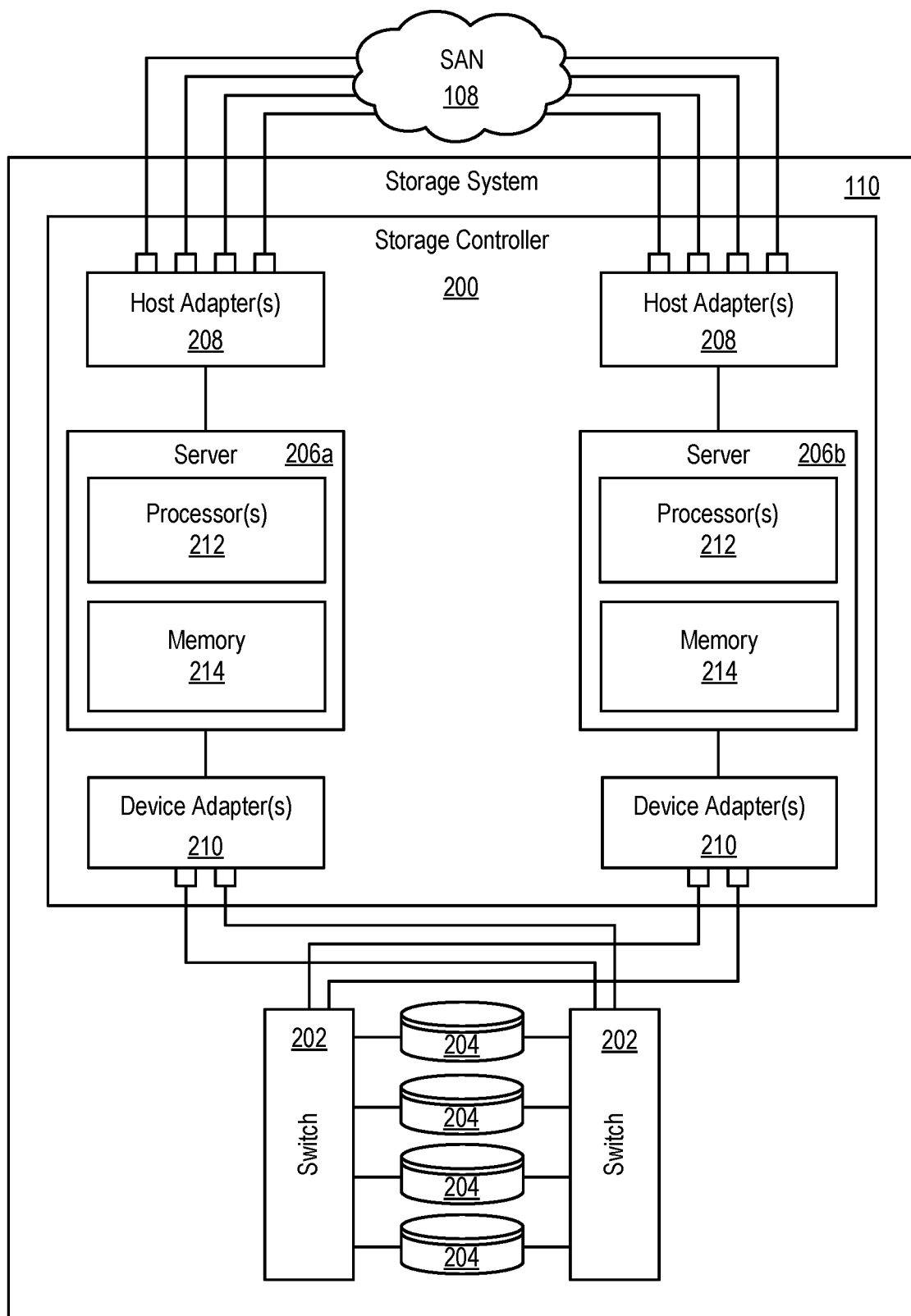
FIG. 2 is a high-level block diagram showing one example of a storage system that may function as a primary or secondary storage system in an asynchronous data mirroring environment.

Referring to FIG. 2, one embodiment of a storage system 110 containing an array of hard-disk drives 204 and/or solid-state drives 204 is illustrated. Such a storage system 110 may function as a primary or secondary storage system in an asynchronous data replication environment. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
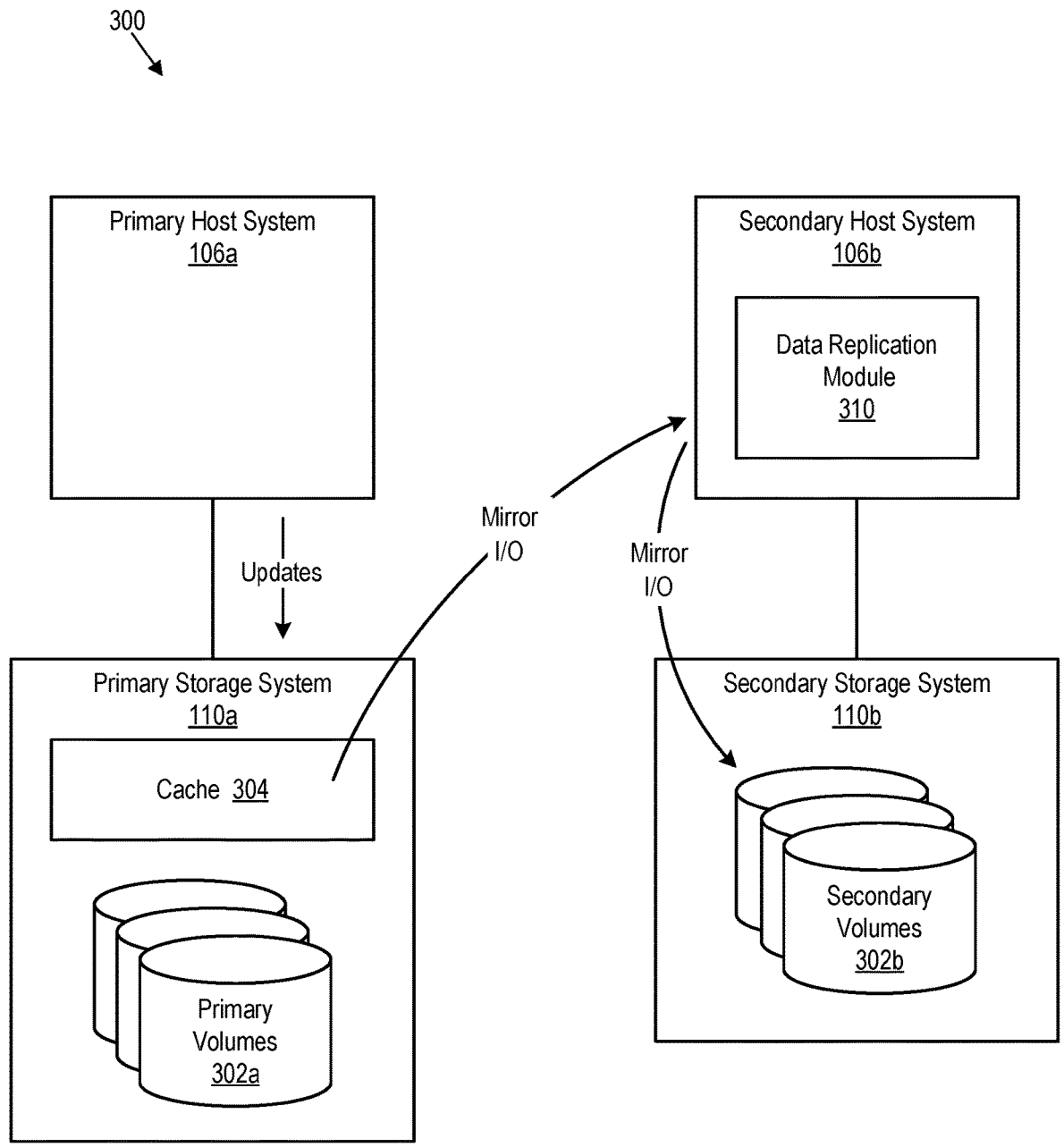
FIG. 3 is a high-level block diagram showing how an asynchronous data mirroring environment may asynchronously mirror data from a primary storage system to a secondary storage system.

Referring to FIG. 3, as previously mentioned, in z/OS Global Mirror (also referred to as "XRC"), data is asynchronously mirrored from primary volumes 302a on a primary storage system 110a to secondary volumes 302b on a secondary storage system 110b in order to maintain two consistent copies of data. The primary and secondary storage systems 110a, 110b may be located at different sites, perhaps hundreds or even thousands of miles away from one another. In the event the primary storage system 110a fails, I/O may be redirected to the secondary storage system 110b, thereby enabling continuous operations.

When updates are received by the primary storage system 110a from a primary host system 106a, z/OS Global Mirror records the updates in cache 304 (a high-speed form of memory 214) of the primary storage system 110a. The updates are then asynchronously mirrored to the secondary storage system 110b as time and resources allow using a data replication module 310 (also known as System Data Mover, or SDM, in the z/OS environment) that is typically hosted on a secondary host system 106b.

Figure 4:
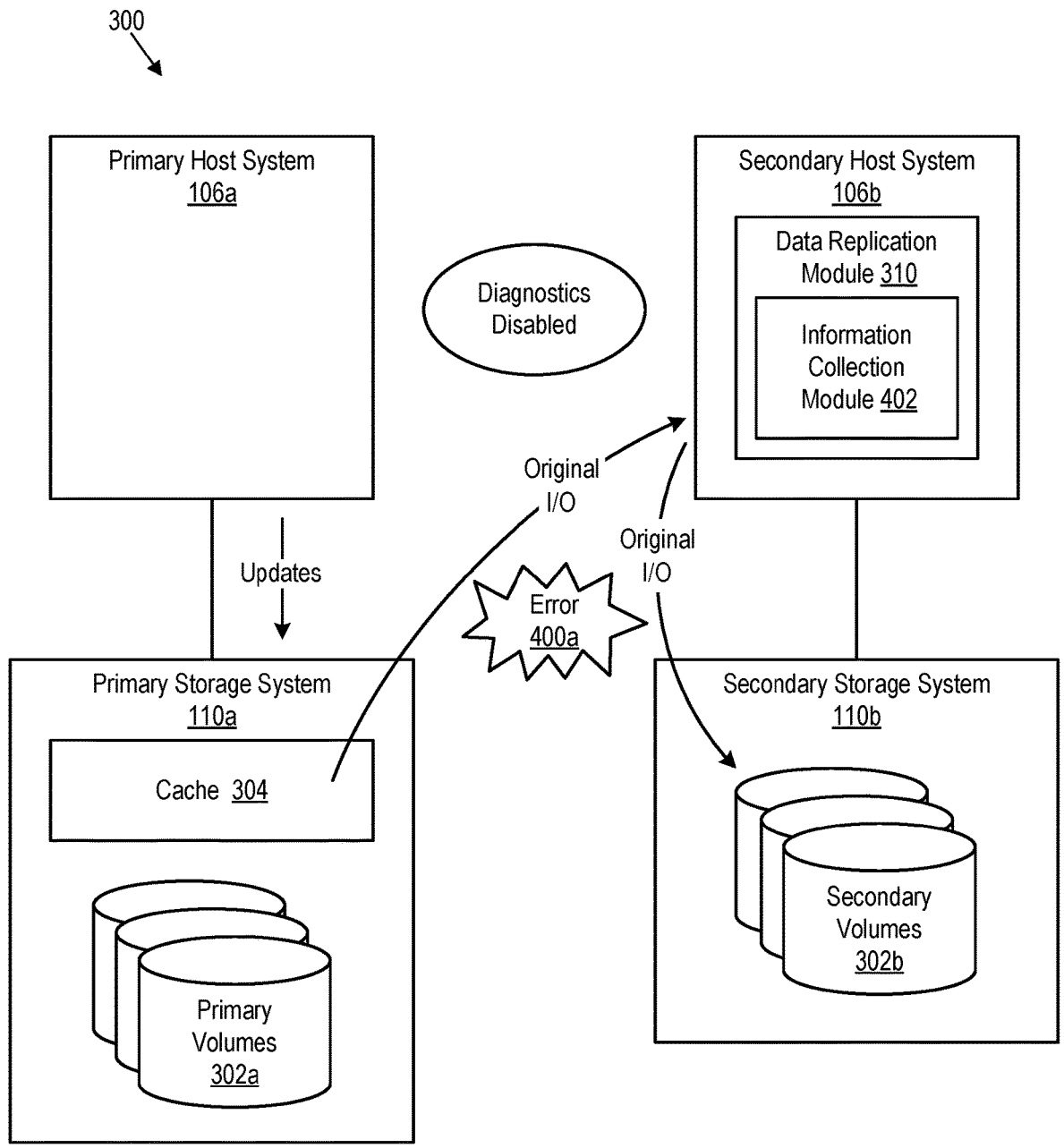
FIG. 4 is a high-level block diagram showing occurrence of an error in the asynchronous data mirroring environment, with diagnostics disabled.

Referring to FIG. 4, when z/OS Global Mirror or other asynchronous data mirroring functions copy data from a primary volume 302a to a secondary volume 302b across long distances, a large number of error conditions 400a may occur. Such error conditions 400a may include, for example, an invalid track format error, a no record found condition, a storage shortage error, or the like. Each error condition 400a may require a specific set of diagnostic information to determine the root cause of the error 400a. In many cases, a system administrator may be unable to capture the desired set of diagnostic information because various diagnostic tools may have been disabled at the time an error 400a occurred, as shown in FIG. 4. Such diagnostic tools often consume significant overhead if they are allowed to run continuously and thus are often disabled during normal operation.

In order to more efficiently collect diagnostic information associated with an error 400a, an information collection module 402 may, in certain embodiments, be included in or in association with the data replication module 310. The information collection module 402 is shown in the data replication module 310 and secondary host system 106b but is not limited to implementation in this location. In general, the information collection module 402 may be configured to detect an error 400a occurring in an asynchronous data replication environment 300 in the course of replicating data from a primary storage system 110a to a secondary storage system 110b. In response to detecting the error condition 400a, the information collection module 402 may modify various diagnostic parameters to improve the collection of diagnostic information. For example, the information collection module 402 may enable (i.e., turn on) various diagnostic functions such as trace functions, state-save functions, logging functions, or the like. This may occur immediately after the initial error 400a has occurred or while it is occurring.

Figure 5:
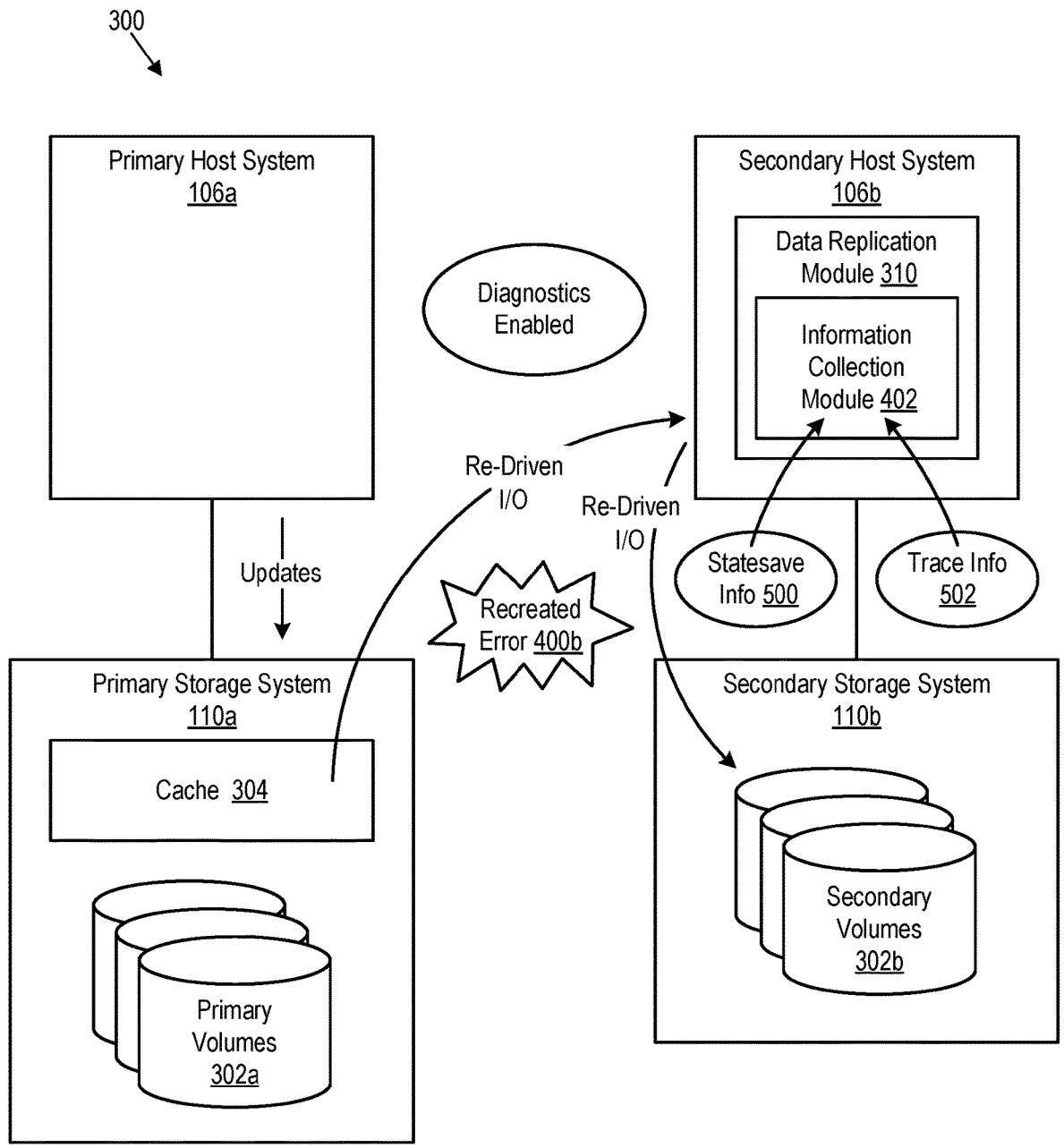
FIG. 5 is a high-level block diagram showing occurrence of a recreated error in the asynchronous data mirroring environment, with diagnostics enabled.

Referring to FIG. 5, once the information collection module 402 has enabled various diagnostic functions, the information collection module 402 may immediately re-drive the I/O associated with the initial error 400a. Ideally, this will recreate the original error 400a (labeled as recreated error 400b). Because the I/O is re-driven in close temporal proximity to the detection of the initial error 400a, the conditions that produced the initial error 400a will likely still exist to produce the recreated error 400b. Thus, this expedited and automated technique has the best chance to recreate an error 400a in transient hardware/software and I/O workload conditions. Because the information collection module 402 has enabled various diagnostic functions in response to the initial error 400a, the information collection module 402 will ideally be able to collect needed diagnostic information in order to analyze and determine the cause of the error 400a. For example, as shown in FIG. 5, the information collection module 402 may be able to collect state-save information 500 and trace information 502 in association with the recreated error 400b.

The above-described techniques are advantageous in that they allow various diagnostic functions to be disabled during normal operations to reduce overhead. Only when an error 400a is detected are diagnostic functions enabled. Once an error 400a is recreated and associated diagnostic information is gathered, the diagnostic functions may again be disabled to reduce overhead. In certain embodiments, the diagnostic functions may be disabled after a certain amount of time. In other embodiments, the diagnostic functions are disabled immediately after desired diagnostic information is gathered. In yet other embodiments, the diagnostic functions are disabled after re-driving I/O a selected number of times or until an error 400a is recreated and diagnostic information is gathered, whichever comes first. In any event, diagnostic functions that are enabled may be disabled after some amount of time or some specified event to reduce overhead in the asynchronous data replication environment 300.

When re-driving I/O in order to recreate an error 400a, the information collection module 402 may, in certain embodiments, constantly save storage controller bitmaps used to form a last consistency group. In this way, when I/O is re-driven, the information collection module 402 will know which tracks (or other storage elements) were involved with a previous consistency group that failed so that they can be recopied to the secondary volumes 302b. The information collection module 402 may also copy any current changes that the storage controller bitmaps require during the re-drive. In other words, as I/O is being re-driven to the secondary volumes 302b, any new updates that occur to the primary volumes 302a may also need to be mirrored to the secondary volumes 302b.

Figure 6:
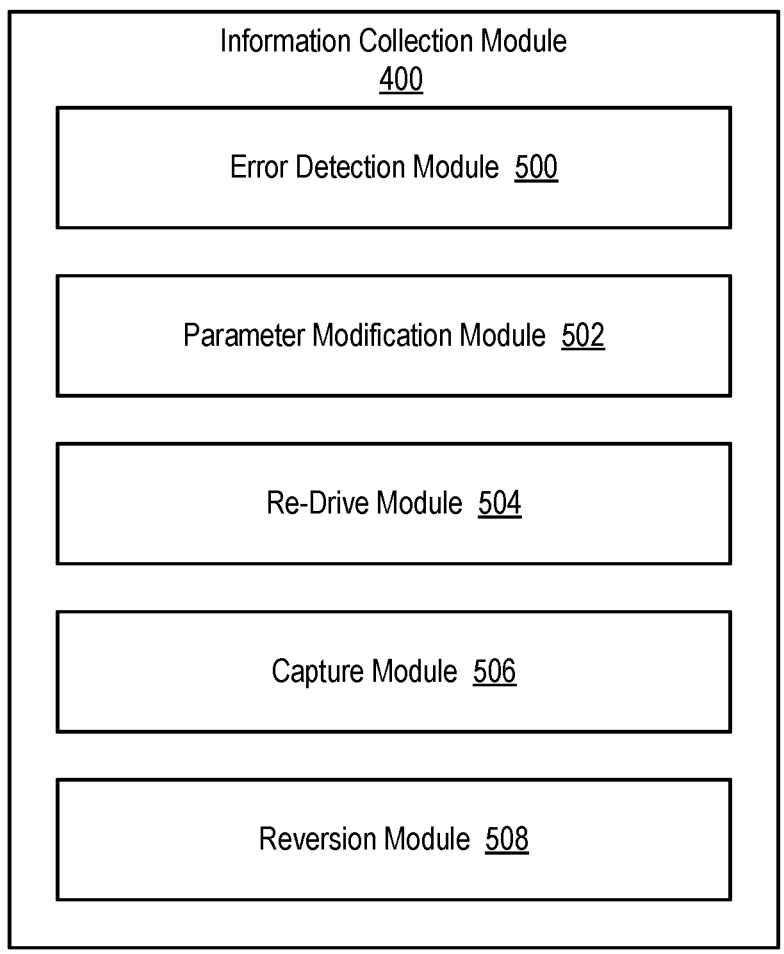
FIG. 6 is a high-level block diagram showing an information collection module and various sub-modules.

Referring to FIG. 6, the information collection module 402 may include various sub-modules that provide various features and functions. These sub-modules may be implemented in hardware, software, firmware, or combinations thereof. The sub-modules illustrated in FIG. 6 are presented by way of example and are not intended to represent an exhaustive list of sub-modules that may be included in the information collection module 402. The information collection module 402 may include more or fewer modules than those illustrated, or the functionality of the modules may be combined or split into additional modules as needed.

As shown, the information collection module 402 may include one or more of an error detection module 500, parameter modification module 502, re-drive module 504, capture module 506, and reversion module 508. The error detection module 500 may be configured to detect errors 400 occurring in the course of replicating data from the primary storage system 110a to the secondary storage system 110b. Such errors 400 may include, for example, invalid track format errors, no record found errors, storage shortage errors, or the like. In response to detecting an error 400, the parameter modification module 502 may modify various diagnostic parameters to improve the collection of diagnostic information. For example, the parameter modification module 502 may enable or turn on diagnostic functions such as trace functions, state-save functions, logging functions, or the like. Under normal operating conditions, these diagnostic functions may be turned off or disabled to reduce overhead in the asynchronous data replication system 300.

In certain embodiments, the parameter modification module 502 may enable diagnostic functions based on the type of error 400a that was detected by the error detection module 500. For example, if, in an XRC environment, the error 400a is an RC=901 condition (i.e., an error having a return code (RC) of 901) indicating there is an invalid track format or no record found problem, the parameter modification module 502 may alter XRC CTRACE options for all data movers on the XRC logical partition (LPAR) to capture desired diagnostic information, for example as follows:
 FLAG NAME(BIGD) ACTION(ON)
 FLAG NAME(DEBUG) ACTION(OFF)
 FLAG NAME(ABEND) ACTION(ON)
 FLAG NAME(ABEND_LIC) ACTION(ON)
 FLAG NAME(NRFITF) ACTION(ON)
 FLAG NAME(SCTRAP) ACTION(ON)
 FLAG NAME(SCTRAP2) ACTION(ON)
 FLAG NAME(TIF) ACTION(ON)
 FLAG NAME(TIF_ERROR) ACTION(ON)

Because an invalid track format or no record found error 400 may in certain cases be caused by a hardware malfunction, the parameter modification module 502 may also prepare the primary or secondary storage systems 110 to collect state-save information and prepare channel extenders to collect error logs. The parameter modification module 502 may also prepare the XRC LPAR to capture all SYSLOG activity for the day.

In a second example, XRC may experience an RC=0203 error condition (i.e., an error having a return code (RC) of 0203) indicating there is a storage shortage problem on the XRC LPAR. For this error condition, the parameter modification module 502 may release all allocated storage for all data movers simulating an XSUSPEND TIMEOUT( ). The parameter modification module 502 may then prepare the XRC LPAR to collect SYSTRACE activity via TRACE ST, 2M, BR=OFF, collect GETMAIN/FREEMAIN GTF trace data, and prepare to capture all SYSLOG activity for the day.

Once the parameter modification module 502 enables various diagnostic functions in accordance with the error 400 that was detected. The re-drive module 504 may attempt to re-drive the I/O for which the error 400 occurred. Ideally this will recreate the error 400a. Upon recreating the error 400a, the capture module 506 will capture diagnostic information in accordance with the diagnostic functions that were enabled. Once desired diagnostic information has been captured, the reversion module 508 may revert back to the original parameters, or in other words disable the diagnostic functions that were enabled. Alternatively, the reversion module 508 may revert back to the original parameters once a certain amount of time has passed, or a certain number of attempts to re-drive the I/O has occurred.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for collecting diagnostic information associated with an error, the method comprising:
 detecting an initial occurrence of an error associated with an I/O operation, the error having a return code associated therewith;

in response to detecting the initial occurrence, enabling a selected set of diagnostic functions to be executed upon reoccurrence of the error, wherein the selected set is disabled at the time of the initial occurrence and selected in accordance with the return code;
re-driving the I/O operation to recreate the error;
specifying a time period to wait for the error to occur;
in the event the error occurs before expiration of the time period, capturing diagnostic information associated with the recreated error using the selected set of diagnostic functions; and
in the event the error does not occur before expiration of the time period, disabling the diagnostic functions without capturing the diagnostic information.

2. The method of claim 1, wherein the diagnostic functions include at least one trace function.

3. The method of claim 1, wherein the diagnostic functions include at least one state-save function.

4. The method of claim 1, wherein re-driving the I/O operation comprises automatically re-driving the I/O operation without user intervention.

5. The method of claim 1, further comprising, after capturing the diagnostic information, disabling the selected set of diagnostic functions.

6. The method of claim 1, wherein the error is associated with at least one of an invalid track format, no record found condition, and storage shortage.

7. A computer program product for collecting diagnostic information associated with an error, the computer program product comprising a non-transitory computer-readable storage medium having computer-usable program code embodied therein, the computer-usable program code configured to perform the following when executed by at least one processor:
detect an initial occurrence of an error associated with an I/O operation, the error having a return code associated therewith;
in response to detecting the initial occurrence, enable a selected set of diagnostic functions to be executed upon reoccurrence of the error, wherein the selected set is disabled at the time of the initial occurrence and selected in accordance with the return code;
re-drive the I/O operation to recreate the error;
specify a time period to wait for the error to occur;
in the event the error occurs before expiration of the time period, capture diagnostic information associated with the recreated error using the selected set of diagnostic functions; and
in the event the error does not occur before expiration of the time period, disable the diagnostic functions without capturing the diagnostic information.

8. The computer program product of claim 7, wherein the diagnostic functions include at least one trace function.

9. The computer program product of claim 7, wherein the diagnostic functions include at least one state-save function.

10. The computer program product of claim 7, wherein re-driving the I/O operation comprises automatically re-driving the I/O operation without user intervention.

11. The computer program product of claim 7, wherein the computer-usable program code is further configured to, after capturing the diagnostic information, disable the selected set of diagnostic functions.

12. The computer program product of claim 7, wherein the error is associated with at least one of an invalid track format, no record found condition, and storage shortage.

13. A system for collecting diagnostic information associated with an error, the system comprising:
at least one processor;
at least one memory device operably coupled to the at least one processor and storing instructions for execution on the at least one processor, the instructions causing the at least one processor to:
detect an initial occurrence of an error associated with an I/O operation, the error having a return code associated therewith;
in response to detecting the initial occurrence, enable a selected set of diagnostic functions to be executed upon reoccurrence of the error, wherein the selected set is disabled at the time of the initial occurrence and selected in accordance with the return code;
re-drive the I/O operation to recreate the error;
specify a time period to wait for the error to occur;
in the event the error occurs before expiration of the time period, capture diagnostic information associated with the recreated error using the selected set of diagnostic functions; and
in the event the error does not occur before expiration of the time period, disable the diagnostic functions without capturing the diagnostic information.

14. The system of claim 13, wherein the diagnostic functions include at least one trace function.

15. The system of claim 13, wherein the diagnostic functions include at least one state-save function.

16. The system of claim 13, wherein re-driving the I/O operation comprises automatically re-driving the I/O operation without user intervention.

17. The system of claim 13, wherein the instructions further cause the at least one processor to, after capturing the diagnostic information, disable the selected set of diagnostic functions.

18. The system of claim 13, wherein the error is associated with at least one of an invalid track format, no record found condition, and storage shortage.

* * * * *